No. 887,640. PATENTED MAY 12, 1908.
G. L. HOXIE.
MACHINE FOR MAKING SAFETY PINS.
APPLICATION FILED JULY 29, 1905.
8 SHEETS—SHEET 1.
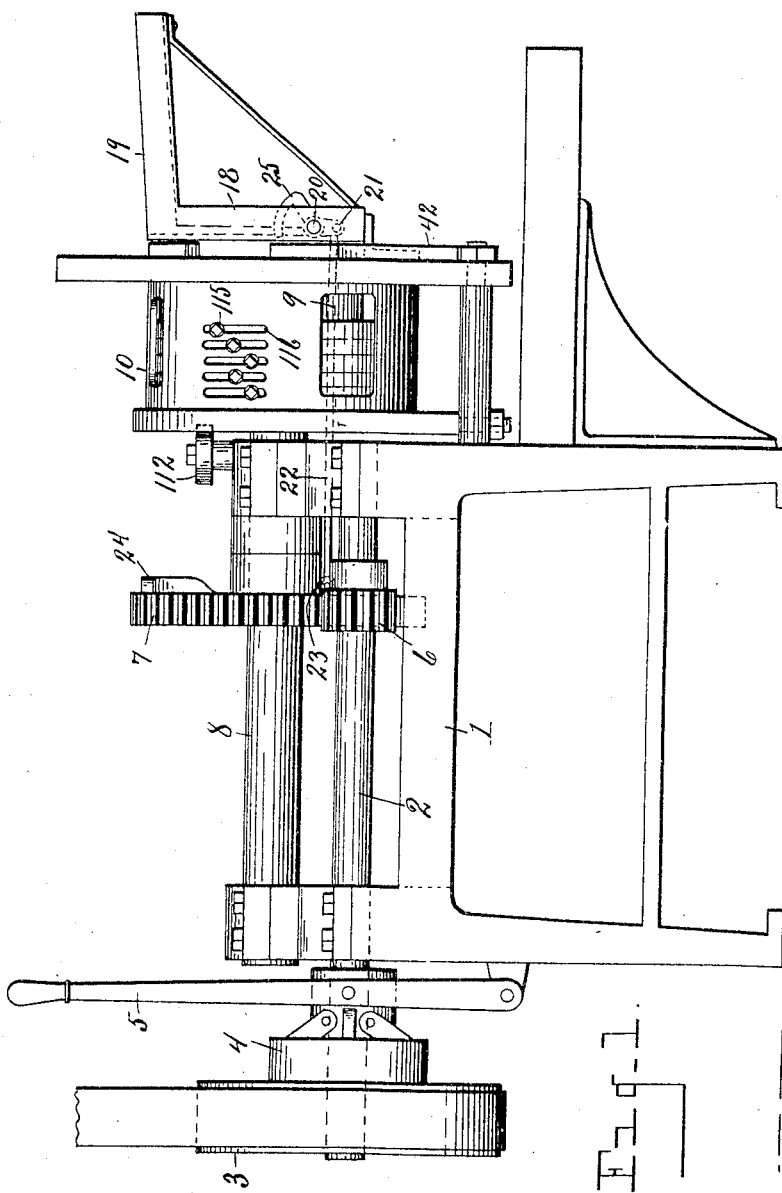

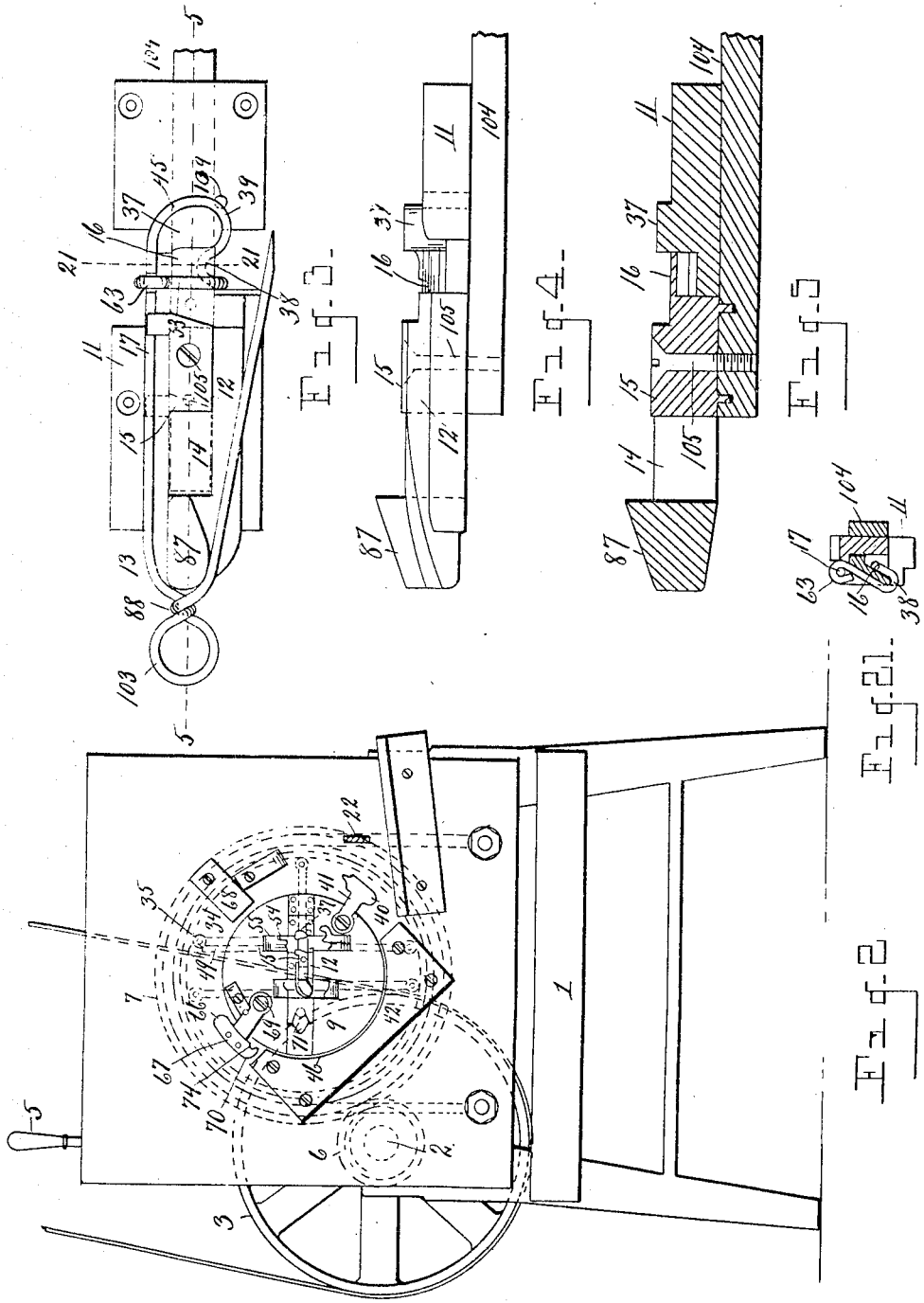

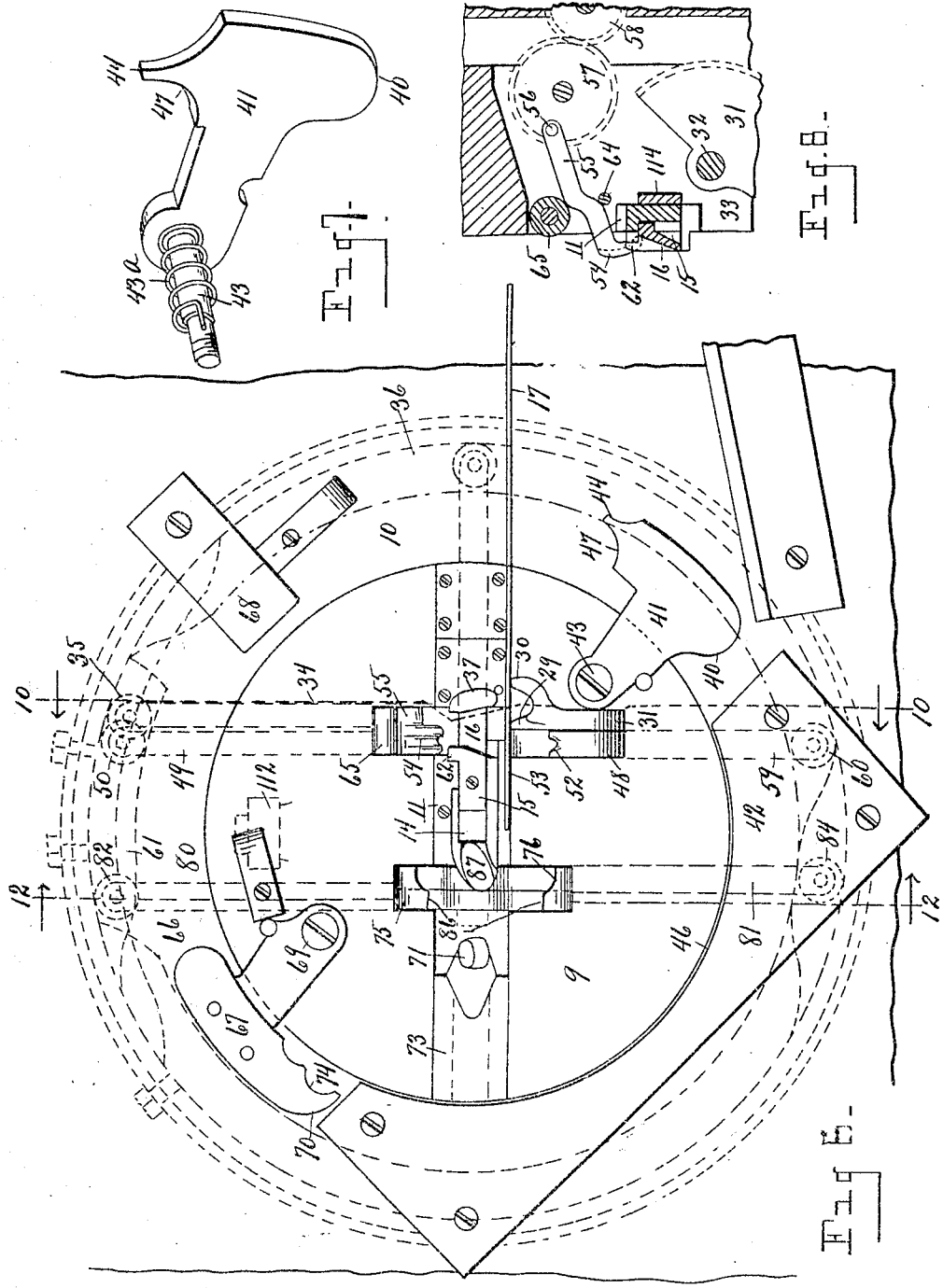

No. 887,640. PATENTED MAY 12, 1908.
G. L. HOXIE.
MACHINE FOR MAKING SAFETY PINS.
APPLICATION FILED JULY 29, 1905.
8 SHEETS—SHEET 4.
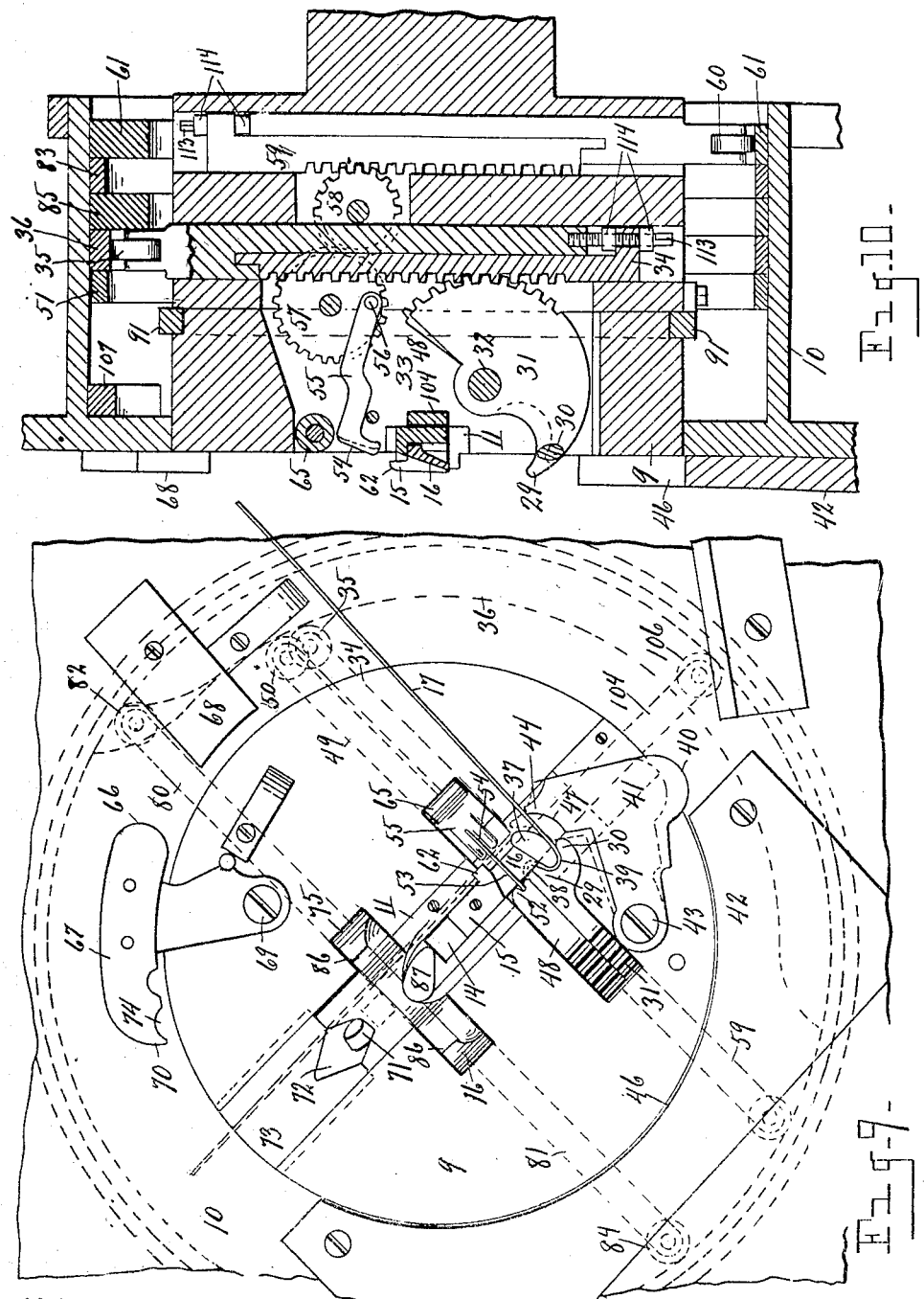

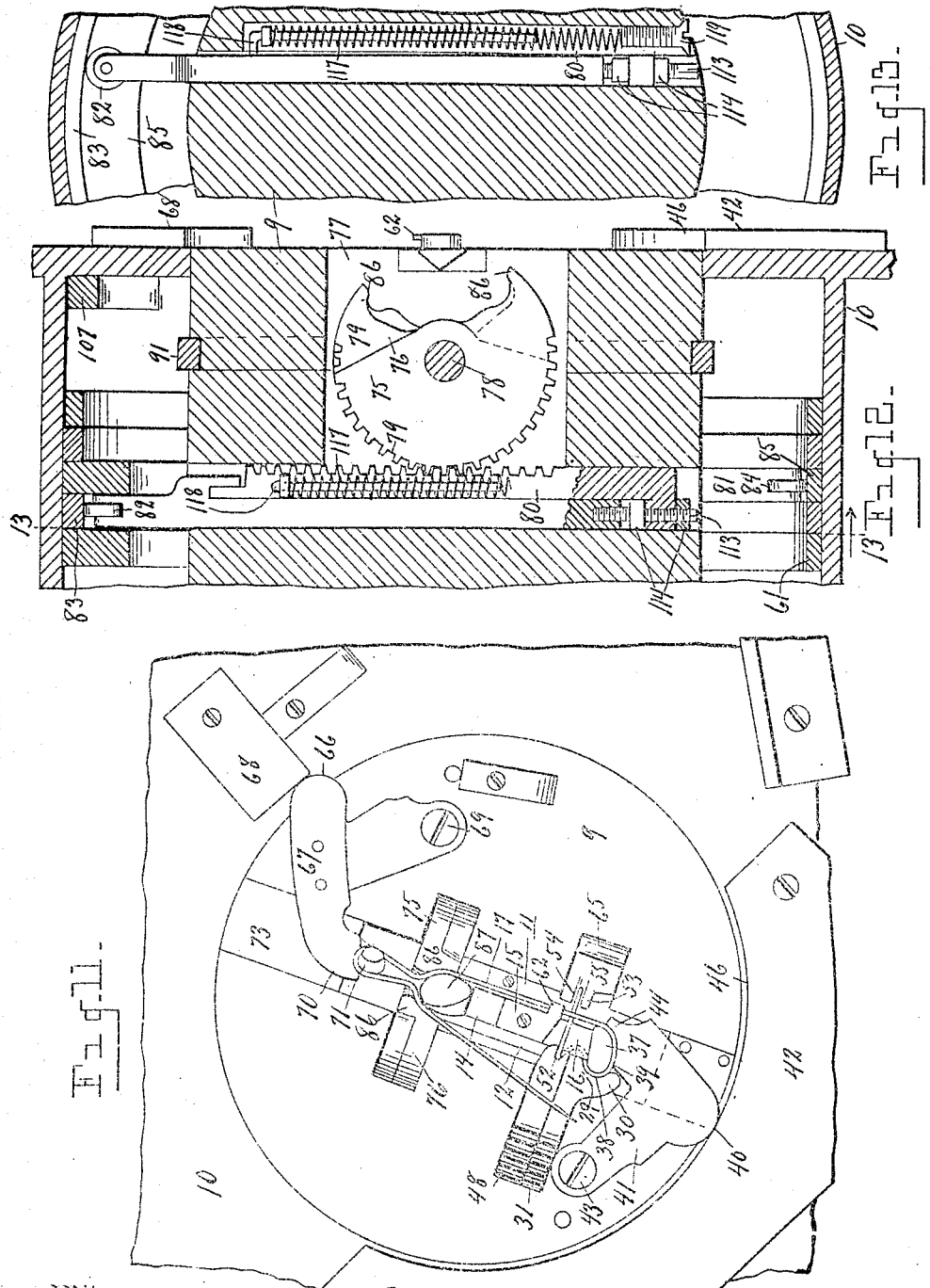

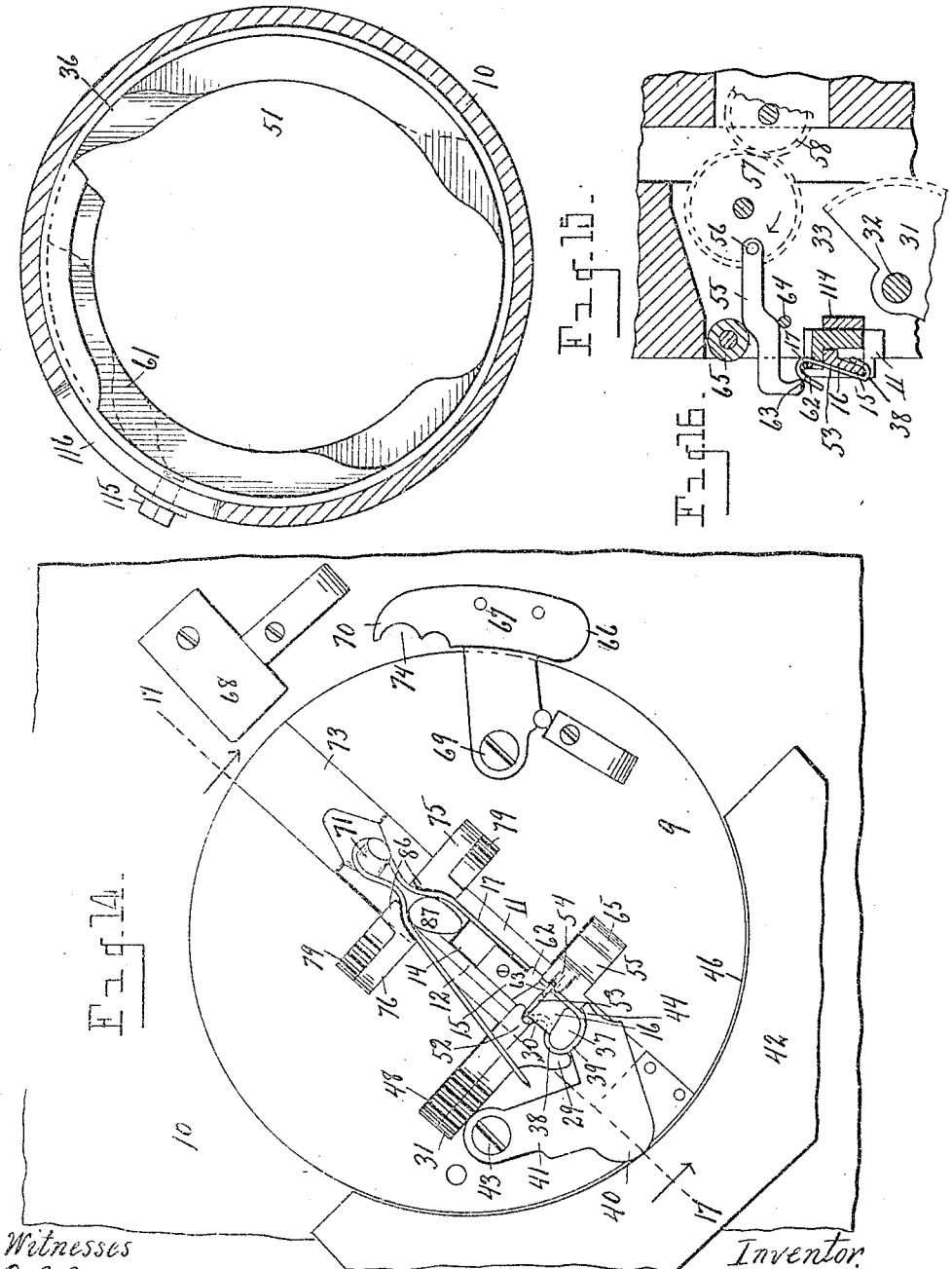

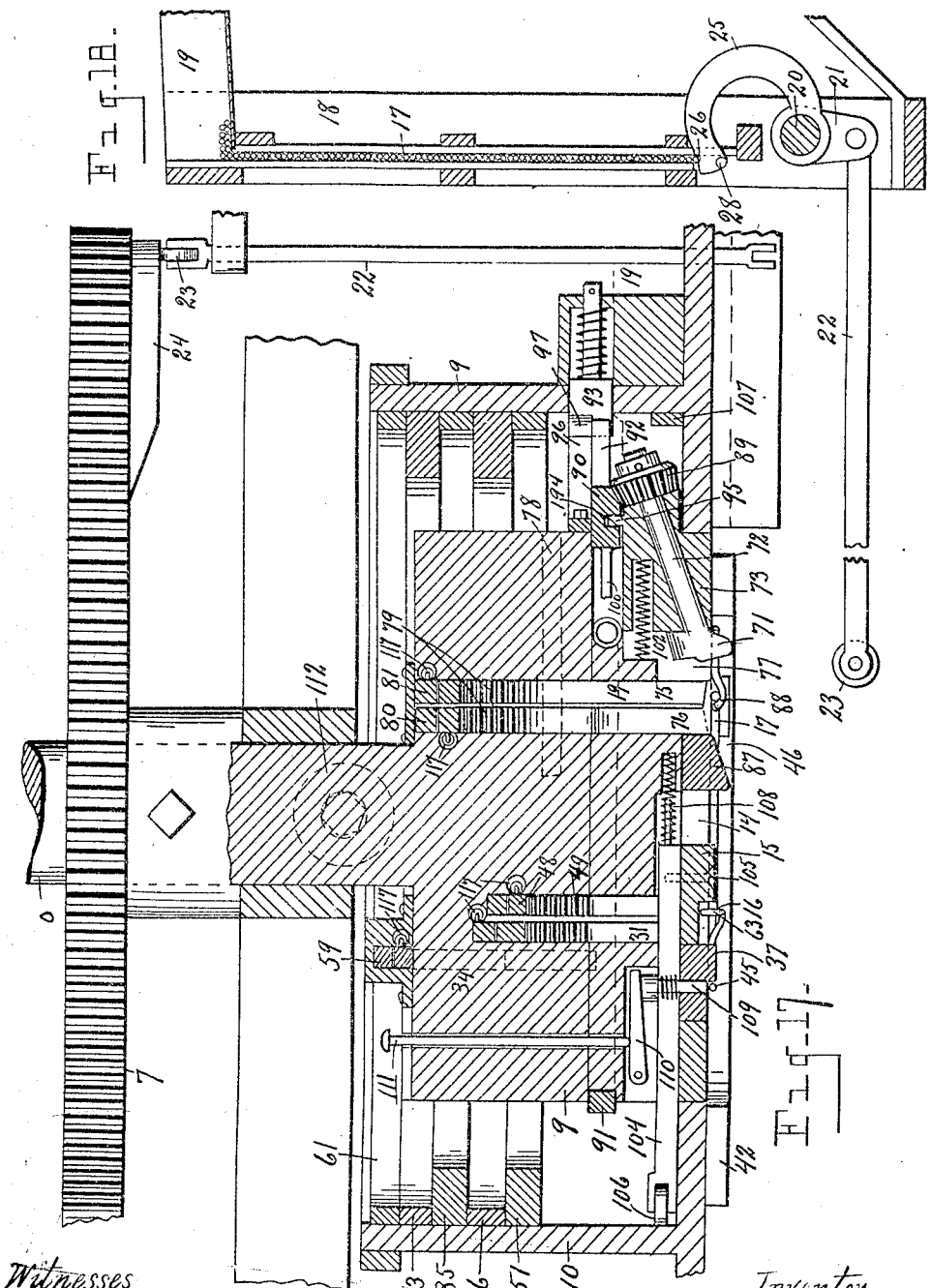

No. 887,640. PATENTED MAY 12, 1908.
G. L. HOXIE.
MACHINE FOR MAKING SAFETY PINS.
APPLICATION FILED JULY 29, 1905.
8 SHEETS—SHEET 8.
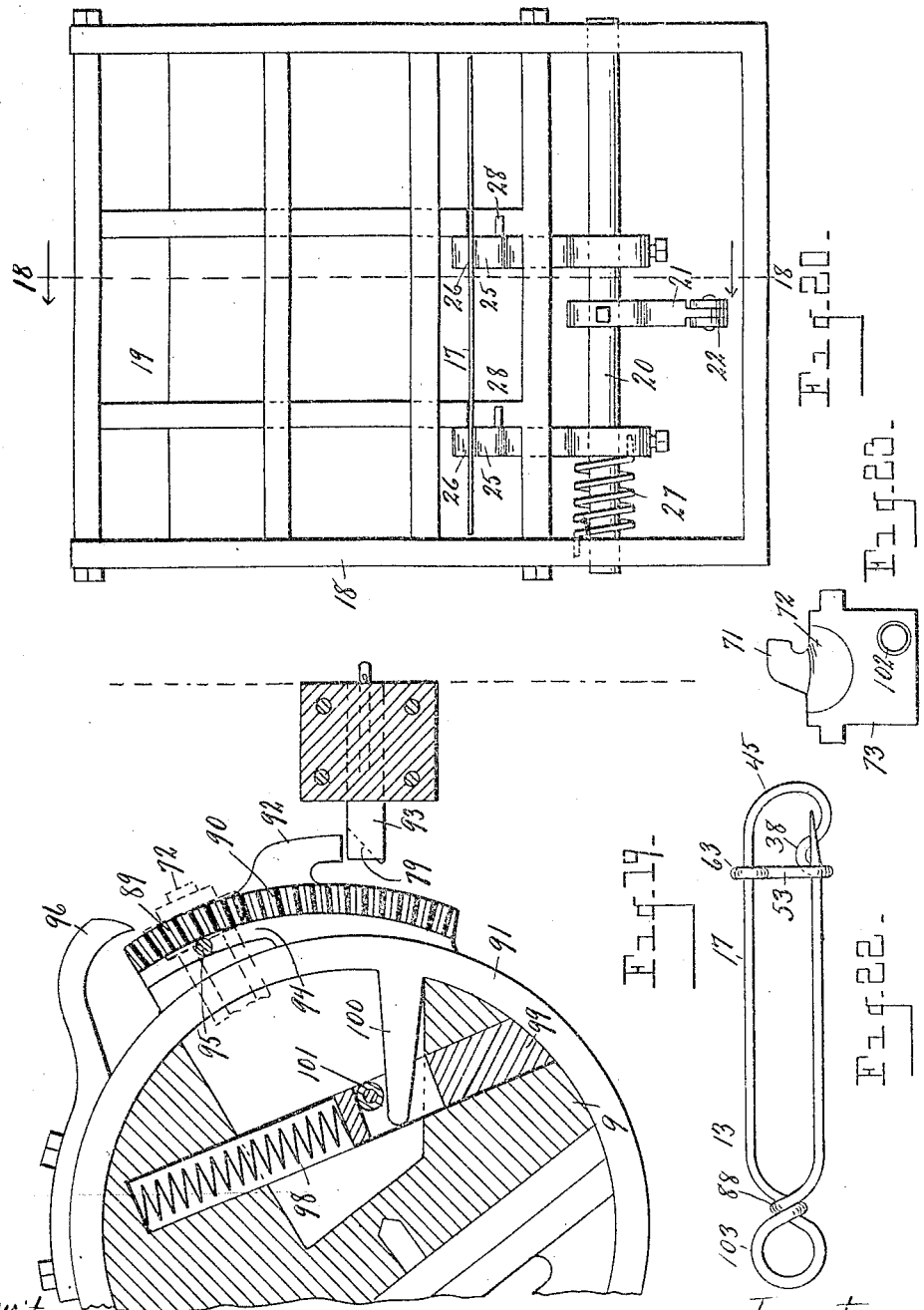

UNITED STATES PATENT OFFICE.

GEORGE L. HOXIE, OF FLORENCE, ALABAMA, ASSIGNOR TO GIBFORD AUTOMATIC SAFETY PIN CO., OF ADRIAN, MICHIGAN, A CORPORATION.

MACHINE FOR MAKING SAFETY-PINS.

No. 887,640.

Specification of Letters Patent.

Patented May 12, 1908.

Application filed July 29, 1905. Serial No. 271,809.

*To all whom it may concern:*

Be it known that I, GEORGE L. HOXIE, a citizen of the United States, residing at Florence, in the county of Lauderdale, State of Alabama, have invented certain new and useful Improvements in Machines for Making Safety-Pins; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in machines for making safety pins, and consists in the construction and arrangement of parts hereinafter fully set forth and pointed out particularly in the claims.

The object of the invention is to provide an automatic machine for the manufacture of a particularly constructed safety pin in a rapid and efficient manner, the arrangement being such as to enable the pin to be formed complete from the strand of wire which is fed into the machine, the product being discharged from the machine ready for carding. The above object is attained by the mechanism illustrated in the accompanying drawings, in which:—

Figure 1 is a side elevation of a machine embodying my invention. Fig. 2 is a front elevation of the machine with the feeding device removed. Fig. 3 is a front elevation of the die in which the pin is formed, showing the completed pin therein. Fig. 4 is a side elevation of Fig. 3. Fig. 5 is a longitudinal section on line 5—5 of Fig. 3. Fig. 6 is a front elevation of the rotary head carrying the forming die and the associated operative parts for forming the safety pin, showing said parts in their initial position at the time the strand, from which the pin is formed, is fed into the machine. Fig. 7 is a perspective view of the angular pivoted arm which forms the wire around the end of the die in shaping the guard loop of the pin. Fig. 8 is a fragmentary view, showing the operative parts that form the eye at the end of the cross bar of the pin. Fig. 9 is an elevation of the parts shown in Fig. 6 in the second position in the operation of forming the pin. Fig. 10 is a transverse section through the rotary head and frame as on line 10—10 of Fig. 6. Fig. 11 is an elevation of the rotary head, showing the parts in the third position in the operation of forming the pin. Fig. 12 is a transverse section through the rotary head and frame as on line 12—12 of Fig. 6. Fig. 13 is a fragmentary view in sectional detail, as on line 13—13 of Fig. 12. Fig. 14 is an elevation of the rotary head, showing the position of the parts at the inception of the twisting operation which forms the eye at the end of the pin. Fig. 15 is an elevation of the cam rings which actuate the several operative parts of the machine, the case appearing in section. Fig. 16 is a similar view to Fig 8, showing the parts in a changed position as hereinafter explained. Fig. 17 is a transverse section through the rotary head and frame as on line 17—17 of Fig. 14. Fig. 18 is a vertical sectional view through the feeding mechanism, as on line 18—18 of Fig. 20. Fig. 19 is a fragmentary view in section of the twisting mechanism, as on line 19—19 of Fig. 17. Fig. 20 is an elevation of the wire feeding mechanism. Fig. 21 is a transverse section as on line 21—21 of Fig. 3. Fig. 22 is an elevation of the pin. Fig. 23 is an end elevation of the movable block and twisting shaft journaled therein.

Referring to the characters of reference, 1 indicates a suitable frame in which is journaled the main shaft 2, driven through the medium of a belt pulley 3 normally loose thereon and made to turn said shaft through the medium of a sliding clutch 4 operated by the lever 5. Fixed to the shaft 2 is a pinion 6 which meshes with a gear wheel 7 mounted upon the counter-shaft 8, also journaled in suitable bearings in the frame! Upon the end of the shaft 8 and rotatable therewith is a head 9 which is surrounded by a fixed circular shell or case 10, the face of the head projecting through a central opening in said case.

Mounted in a channel crossing the face of the head transversely and rigidly secured therein, is a die plate 11, shown more clearly in Figs. 3, 4 and 5, having a raised central portion 12 around which the safety pin 13 (shown in Fig. 3) is formed. Passing centrally through the raised central portion of the die is a rectangular opening 14 in which is seated to reciprocate a movable forming member 15 having a forwardly projecting inclined lip 16 over which the wire of the pin is formed, as hereinafter explained.

The wire strands 17 from which the safety pins are formed, are confined in a magazine, consisting of a suitable frame 18 having at its sides vertical guides which receive the ends of said wires and down which said wires are fed by gravity being supplied from a suitable hopper 19. At the lower end of the magazine frame is a horizontal shaft 20 having a short crank 21 thereon pivoted to a horizontally reciprocatory bar 22 carrying at its inner end an anti-friction roller 23 which stands in the path of the cam track 24 projecting from the face of the gear wheel 7, whereby a rotation of said wheel will impart an intermittent reciprocation to the rod 22 and rock the shaft 20. Upon the shaft 20 are the curved feeding fingers 25 having notches 26 in their upper edges into which the wire strands are adapted to fall when said notches are brought into alinement with the guides in the magazine, whereby the wire strands are successively fed to the machine as the shaft 20 is rocked in its bearings; the curved feeding fingers as they are carrying the strand forward into position, serve to hold up the remaining strands in the magazine until said fingers return to allow the succeeding strand to drop into the notches 26 therein. Upon the shaft 20, as will be seen on referring to Fig. 20, is a coiled spring 27 which returns said shaft after having been actuated by the rod 22. Upon the feeding fingers are the lateral pins 28 which engage the vertical bars of the magazine frame and prevent said fingers from being returned too far by the action of the spring 27.

The feeding fingers present the strand 17 to the machine in the position shown in Fig. 6, said strand lying parallel with the lower edge of the die plate 11 in which position it is engaged by the prongs 29 and 30 (see Fig. 6) on the outer end of the segmental gear member 31 journaled upon a short transverse pin 32 crossing the opening 33 (see Fig. 10) in the head 9, the teeth of said gear member meshing with the rack bar 34 carrying at one end an anti-friction roller 35 which runs in contact with a circular cam track 36 adjustably secured to the shell or case 10. The movement of the parts is so timed that as the wire is fed into the machine, the prongs 29 and 30 engage the wire and force it against the end of the oblong lug 37 upon the end of the die, the prong 30 carrying the wire partially around said lug and the prong 29 crowding the wire under the inclined lip 16 of the movable former 15, producing respectively the bends 38 and 39 in the wire at which time the parts are in the position shown in Fig. 9. Lying contiguous to the segmental gear member 31 within the recess 33 and mounted upon the shaft 32 is a like segmental gear member 48, the teeth of which are engaged by a rack bar 49, similar to rack bar 34, and shown by dotted lines in Fig. 9, said rack bar carrying an anti-friction roller 50 adapted to travel in peripheral contact with the circular cam track 51 located within the circular case 10, the high point on said cam track moving said rack longitudinally to turn the gear member 48 upon its axis of oscillation, causing the notched end 52 thereof to engage the short end 53 of the wire strand (which is caused to stand upwardly by the operation of the prong 29 of the gear member 31, forcing the strand under the loop 16) and carry said end 53 of the strand transversely across the inclined lip 16 and into the channel 54 in the outer end of the dog 55, which is also located in the recess 33 on the opposite side of the die from the gear members 31 and 48, and is pivoted at 56 to the face of the gear wheel 57 journaled in the head 9 and meshing with a pinion 58 also journaled in said head and engaged by the longitudinally reciprocatory rack bar 59 mounted in the head carrying the anti-friction roller 60 running in peripheral contact with the circular cam track 61 located within the case 10.

The movements of the gear members 31 and 48 are nearly simultaneous so that the short end 53 of the strand is thrown across the lip 16, and into the channel in the face of the dog 55 at about the time the strand is shaped around the lug 37 by the operation of the gear member 31. A further rotation of the head 9 causes the rounded end 40 of the pivoted arm 41 to engage the plate 42 bolted to the face of the casing, and swing said arm upon the pivot bolt 43, by means of which it is attached to the face of the head 9, carrying the projecting end 44 of said arm against the wire 17 and forcing said wire around the lug 37 on the die, as shown in Figs. 9, 11 and 14, thereby forming the guard loop 45 of the pin. The curved face 46 of the plate 42 is concentric with the axis of oscillation of the head, whereby the arm 41 is held in the position shown in Fig. 14 for nearly one-half of a revolution of said head, the concaved face 47 of said arm fitting the contour of the lug 37 and shaping the wire thereto to give the proper form to said guard loop 45. Upon the pivot bolt 43 of the arm 41 and engaging the shank of said arm is a coiled spring 43$^a$ whose tension is exerted to restore said arm after its operation. At the completion of the operation of the arm 41 the strand 17 lies along the side of the die parallel therewith and extends across and in front of the short end portion or cross bar 53 of the wire, the strand 17 engaging under the projecting shoulder 62 on the movable forming member of the die, as shown by dotted lines in Fig. 9. At this point in the operation of the machine, the dog 55 is projected outwardly through the operation of the rack 59 and meshing gears 58 and 57 to bend the end of the cross bar 53 over the strand wire 17 to form the eye 63, which position of said dog is shown in Fig. 16. A further rotation of the gear 57, whose movement is to the right, will raise the inner end of the dog and force the outer end thereof downwardly, as shown in Fig. 8, said dog working over the pin 64 which supports it, in which last position the dog is drawn slightly rearwardly as said gear 57 reaches the limit of its movement, whereby the eye 63 is tightly closed around the strand 17. Above the dog 55 is an anti-friction roller 65 which lies in peripheral contact therewith and directs said dog in its operation. The angular formation of the dog near its longitudinal center is for the purpose of forcing it downwardly by contact with the roller 65, as it is projected in the operation of forming the eye.

After the completion of the operation of forming the eye 63, and with the parts practically in the position shown by dotted lines in Fig. 9, a further rotation of the head will carry the rounded end 66 of the T-shape clamping arm 67, into engagement with the plate 68 bolted to the face of the frame and actuate said arm upon the pivot screw 69 with which it is secured to the face of the head 9, so as to cause the end 70 thereof to engage the projecting strand 17 and form it around the hook-shaped lug 71 projecting from the end of the inclined shaft 72 passing diagonally through and journaled in a movable block 73 (see Fig. 17) seated in the head 9 at the finishing end of the die, and form the strand around said lug, as shown in Fig. 11, the concaved portion 74 of said arm fitting around said lug to shape the wire thereto.

After the strand has been formed around the lug 71, the opposite sides thereof lie between the opposed gripping jaws 75 and 76 which are mounted to oscillate in a recess 77 in the head upon a pin or shaft 78, each of said jaws having a segment of gear teeth 79 which mesh respectively with the longitudinally movable rack bars 80 and 81. The rack bar 80 having at one end an anti-friction roller 82 which runs in peripheral contact with the cam track 83, and the rack bar 81 having an anti-friction roller 84 which runs in peripheral contact with the cam track 85. These cam tracks are so positioned that the high points thereof actuate the rack bars at the proper moment to close the gripping jaws and cause the jaw faces 86 thereof to engage and bring the opposed strands of the wire together between the hook-shape lug 71 and the raised rounded end portion 87 of the die, said faces partially embracing said rounded end portion to shape the wire thereto. At the moment the gripping jaws have firmly gripped the wire, as above stated, the rounded end of the arm 67 will have passed from engagement with the actuating plate 68 for the purpose of permitting the shaft 72 and lug 71 to rotate and twist that part of the loop of the pin which lies between said lug and the raised end portion 87 of the die, as shown at 88 in Figs. 3 and 22. The operation of twisting said loop is accomplished by means of a pinion 89 upon the shaft 72 which meshes with a rack segment 90 (see Fig. 19) mounted upon the periphery of a floating ring 91 which lies in a peripheral channel of the head 9. Projecting from said segment is a stop 92 adapted as the head revolves to engage a spring-actuated latch-bolt 93 suitably mounted in the case, whereby said ring and rack segment are momentarily arrested, causing a rotation of the pinion 89 and shaft 72 carried by the rotary head 9 as said head continues to revolve, thereby twisting the loop at the end of the pin through which the lug 71 of the shaft 72 protrudes. To prevent too great a strain upon the wires of the loop as they are twisted together, the block 73 in which the shaft 72 is journaled is caused to slide radially of the head by means of an eccentric way 94 formed in the projecting portion of the ring 91, carrying the gear segment, into which the pin 95 projecting from the block 73 extends (as clearly shown in Fig. 17) whereby as the loop is shortened by the twisting of the wire thereof, the slidable block 73 is permitted to approach the end of the die to compensate for the take-up in said wire, the rack bar 90 being also eccentric to the axis of rotation of the head to keep the pinion 89 in proper engagement therewith.

At the completion of the twisting operation when the pinion 89 shall have reached the end of the rack 90 a curved tripping arm 96 mounted upon the head 9 will strike the beveled face 97 of the latch bolt 93 and trip said bolt so as to unlock the stop 92 thereby permitting the ring 91 and rack segment 90 to again revolve with the head 9, said ring and rack segment being turned backwardly upon said head to their normal position by means of the compressible spring 98 which is seated in a recess in said head and is engaged by a sliding block 99 having an opening therein into which projects an arm 100 on the ring 91 and engages an anti-friction roller 101 therein, whereby when the ring is arrested and the head continues to revolve, the spring 98 is contracted and the power stored therein is exerted to return said parts after the latch bolt has been tripped to release the ring. Seated in the block 73 and engaging the wall of the recess in which said block is mounted, is a compressible spring 102, the tension of which is exerted to force said block outwardly and restore the pin 95 to the channel 94 as the ring 91 returns to its normal position after the operation of twisting.

The twisting of the strands of the wire together as described, forms an eye 103 at the end of the pin and practically completes the operation, except that of discharging the pin from the die. Before the pin can be discharged, it is necessary to slide the movable forming member in the die rearwardly so as to carry the inclined lip 16 thereon from over the inwardly bent portion 38 of the pin, which, together with the cross bar 53 forms the keeper in which the point of the pin is confined, as shown in Fig. 22. The retracted position of said movable forming member is illustrated by dotted lines in Fig. 3, and the movement of said member is accomplished through the medium of a bar 104 secured to said member 15 by the screw bolt 105 and actuated longitudinally by means of an anti-friction roller 106 journaled at the end thereof adapted to engage a cam track 107 located within the case (see Fig. 12) and so positioned as to cause a retraction of said movable forming member in the die at the proper time Engaging the inner end of the bar 104 is a coiled spring 108 (Fig. 17) which serves to return said bar after it has been actuated by said cam track. While the movable forming member 15 is held retracted, the formed pin is discharged from the die by means of a spring actuated plunger 109 which passes through the face of the die, as clearly shown in Figs. 3 and 17, at a point to engage the guard loop 45 where it bends around the shaping lug 37 and forces said loop from said lug, thereby discharging the completed pin from the machine. The spring-actuated plunger is operated through the medium of a lever 110 mounted in the head and engaging the inner end of said plunger, said lever being in turn engaged by a rod 111 extending transversely through said head and having a rounded end adapted to encounter the anti-friction roller 112 (see Fig. 1 and dotted lines in Fig. 6) mounted upon the frame in the rear of the rotary head, whereby as said head revolves, a quick outward movement is at the proper time imparted to the discharging plunger 109.

It will be understood that the rotation of the head 9 is continuous and that the operation of forming the pins is very quickly done, a pin being made for each rotation of the head, and said head being geared to make about sixty revolutions per minute.

It will be noted that each of the rack bars is formed in two parts, comprising one part which carries the rack teeth, and another part which carries the anti-friction roller, said parts being inter-locked and rendered adjustable by means of a screw 113 which passes through the part of each of the racks carrying the teeth and screws into the part carrying the anti-friction roller, said screw having thereon the jam nuts 114, whereby it may be locked after adjustment. By means of said screw, the rack may be increased or decreased in length so as to effect a proper operation of the part actuated thereby, as will be well understood.

Each of the cam tracks is provided with a bolt 115 which extends through a slot 116 in the case 10 and screws into the cam track as shown in Fig. 15, whereby said cam tracks or rings may be shifted in a circle to so place them that their high points will actuate the several rack bars at the proper moment, thereby timing their operation in harmony with the several functions of the machine.

Each of the rack bars which operate the several parts that shape the wire upon the forming die, is provided with a returning spring 117 attached thereto by means of a rod 118 connected with said bar upon which said spring is wound, said spring lying in a recess adjacent to the rack bar and confined therein by a suitable screw-plug 119, as clearly shown in Fig. 13. As each of the rack bars is provided with such a returning spring, said bars are quickly returned to their normal position after the roller at the end of said bar passes the high point of the cam track upon which it travels, said track actuating said bar against the action of the spring in one direction and said bar being returned in the opposite direction by said spring.

Having thus fully set forth my invention, what I claim as new and desire to secure by Letters Patent is:—

1. A machine for making safety pins, comprising a rotary head, a forming die in said head on which the pin is formed, means for feeding a strand to the forming die, means for shaping said strand upon said forming die to produce the keeper and guard loop of the pin, means for shaping said strand to form the rear eye and for twisting the strands between the eye and body of the pin, and means for releasing the pin from the forming die and discharging it therefrom.

2. In a machine for making safety pins, the combination of a rotary head, a forming die in said head, means for automatically feeding a wire strand to said die and shaping it thereon to produce a keeper and guard at one end and a twisted eye at the other end of said pin, said shaping means being actuated automatically during the rotation of said head.

3. A machine for making safety pins, comprising a rotary head, a forming die in said head, means mounted in said head for forming a wire strand step by step upon said die to produce a completed pin having a keeper and guard at one end and an eye at the opposite end, said forming operation occurring during the rotation of said head.

4. A machine for making safety pins, comprising a rotary head, having a forming die therein, means for automatically feeding a straight strand of wire to said die during the rotation of said head, means carried by said head for automatically shaping the strand to said die to form a completed pin having a guard at one end and an eye at the other end, the forming of the pin occurring during the rotation of said head, and means for discharging the pin from said die.

5. A machine for making safety pins, comprising a rotary head, a forming die in said head, a movable forming member in said die, means for feeding a strand to said forming die, means for shaping a portion of said strand upon said movable forming member and around said die to produce a safety pin, means for actuating said movable member of the die to release the formed pin, and means for discharging the pin from the die, all of said operations occurring during the continuous rotation of the head.

6. A machine for making safety pins, comprising a rotary head, a forming die in said head, having a movable forming member, means for feeding a strand into the machine, means for shaping the strand upon said movable member and around said die to form a safety pin, and means for actuating said movable member to release the pin and permit it to be discharged from the machine.

7. A machine for making safety pins, comprising a rotary head, a forming die in said head, a movable forming member mounted in said die, means for feeding a strand to said die, means for shaping said strand upon said movable member and around said die, means for twisting the shank of the pin and means for discharging the pin from the machine.

8. A machine for making safety pins, comprising a rotary head, a forming die in said head, means for feeding a strand to said die, means for shaping the strand to the forming die to produce a guard loop and a cross bar adjacent to said loop, means for gripping the shank of the pin to draw the strands thereof together, means for twisting the strands of the shank, and for discharging the pin from the machine, all of said operations being concurrent with the rotation of said head.

9. In a machine for making safety pins, the combination with a rotary head, of a forming die mounted centrally upon the face of said head, and having such contour as to give the required shape to the pin, means for automatically feeding a strand to the die as the head revolves, and means for automatically shaping the strand around the die to form the pin and for discharging the pin therefrom during the rotation of said head.

10. In a machine for making safety pins, the combination with a rotary head, of a die upon which the pin is adapted to be formed mounted on the face of said head, means for feeding a strand to the machine, means for shaping the strand around one end of the die to form the guard loop of the pin, means for bending the cross bar across the top of the pin and forming an eye in its end around the strand, means for looping the opposite end of the pin to form an eye therein, means for rotating said eye to twist the shank of the pin, and means for discharging the completed pin from the die.

11. In a machine for making safety pins, the combination of a rotary head mounted to revolve within an embracing circular case, a die upon the face of said head upon which a pin is adapted to be formed, means for feeding a strand to the machine, segmental gear members for engaging the strand and shaping it to the die to form the keeper and guard loop and for bending the cross bar across said loop, a dog for forming an eye in the end of said cross bar around the strand, means for bending the strand around a hooked lug to form a loop at the end of the pin opposite to the guard loop, grippers adapted to engage the strands of said loop and close the loop around said hooked lug, means for rotating said lug to twist the shank of the pin, movable rack bars for actuating the segmental gear members, dog, and grippers, and cam tracks within the circular case adapted to actuate said racks.

12. In a machine for making safety pins, the combination with a rotary head, of a forming die upon the face of the head upon which the pin is adapted to be shaped, means for feeding a strand to the machine, a movable forming member in the die having an inclined lip, a segmental gear member having prongs adapted to engage the strand to carry a portion thereof under said lip and bend the strand around the end of the die to form the guard loop, a second segmental gear member adapted to engage the short end of the strand and bend it across the upper face of said lip to form the cross bar, means for swinging the strand parallel with the die and across the free end of said bar, a dog for forming an eye in the cross bar around said strand, a rotary hook member remote from the opposite end of the die, means for bending the strand around said hook member, grippers for pinching the strands together between said hook member and the end of the die, means for rotating the hooked member to twist the shank of the pin, means for operating the several movable parts, and means for discharging the formed pin from the die, all of said parts being actuated by the rotation of said head.

13. In a machine for making safety pins, the combination of the rotary head, carrying upon its face a forming die upon which the pin is adapted to be formed, a movable forming member seated in said die under which the keeper is adapted to be formed and over which the cross bar is bent, means for feeding a strand to the machine and forming it upon said die to shape the pin, and means for actuating the movable forming member in the die to release the pin after it has been formed, said movable parts being carried in and actuated by the rotation of said head.

14. In a machine for manufacturing safety pins, the combination of a rotary head, a stationary case embracing said head, a die in said head upon which the pin is adapted to be formed, means for feeding a strand to the machine, movable members mounted on the head for shaping the strand to said die to form the pin and for twisting the pin at the end to form an eye and shank, fixed devices mounted upon and in said case for actuating said movable members to form the pin upon the die as said head revolves.

15. In a machine for manufacturing safety pins, the combination with the means for feeding the strands to the machine, of a die upon which the pin is formed, means for introducing the strand to said die to form the guard loop, cross bar, end loop and twisted shank in consecutive order, and means for discharging the completed pin.

16. In a machine for making safety pins, the combination of a rotary head, a forming die in said head, means for feeding a strand to the machine and forming it upon said die to produce a pin, a rotary shaft having a lug adapted to engage a loop at one end of the pin, a pinion on said shaft, a movable ring upon the head carrying a rack engaging said pinion, means for automatically arresting said ring to cause a rotation of said shaft, and means for releasing the ring to cause it to again revolve with the head.

In testimony whereof, I sign this specification in the presence of two witnesses.

GEORGE L. HOXIE.

Witnesses:
E. S. WHEELER,
I. G. HOWLETT.